(12) United States Patent
Taki et al.

(10) Patent No.: US 7,751,946 B2
(45) Date of Patent: Jul. 6, 2010

(54) REMOTE CONTROL SYSTEM AND REMOTE CONTROL METHOD

(75) Inventors: Naoki Taki, Okazaki (JP); Atsushi Niwa, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 939 days.

(21) Appl. No.: 11/513,374

(22) Filed: Aug. 31, 2006

(65) Prior Publication Data

US 2007/0055415 A1    Mar. 8, 2007

(30) Foreign Application Priority Data

Sep. 5, 2005  (JP) .............................. 2005-256925

(51) Int. Cl.
*G06F 17/00* (2006.01)

(52) U.S. Cl. .............................. 701/2; 701/1; 701/200; 180/287; 180/315; 180/446; 340/426.21; 340/825.69; 340/825.71; 340/988; 340/989; 455/411; 703/8

(58) Field of Classification Search ....................... None
See application file for complete search history.

(56) References Cited

U.S. PATENT DOCUMENTS

| | | | | |
|---|---|---|---|---|
| 3,983,953 A | * | 10/1976 | Bayle | 180/446 |
| 4,893,240 A | * | 1/1990 | Karkouti | 701/2 |
| 5,640,323 A | * | 6/1997 | Kleimenhagen et al. | 701/1 |
| 5,828,316 A | * | 10/1998 | DiCroce | 340/825.69 |
| 6,028,537 A | * | 2/2000 | Suman et al. | 340/988 |
| 6,611,201 B1 | * | 8/2003 | Bishop et al. | 340/426.21 |
| 2003/0162528 A1 | * | 8/2003 | Juzswik | 455/411 |
| 2003/0193404 A1 | * | 10/2003 | Joao | 340/825.71 |
| 2007/0299577 A1 | * | 12/2007 | Hattori et al. | 701/32 |

FOREIGN PATENT DOCUMENTS

| JP | A-2003-041821 | 2/2003 |
|---|---|---|
| JP | A-2004-224067 | 8/2004 |
| JP | 2006-63650 | 3/2006 |

* cited by examiner

*Primary Examiner*—Khoi Tran
*Assistant Examiner*—Jonathan Sample
(74) *Attorney, Agent, or Firm*—Finnegan, Henderson, Farabow, Garrett & Dunner, LLP

(57) ABSTRACT

In a remote control system, the remote control of a vehicle function is executed. The remote control system includes a control terminal and a cancellation device. The control terminal transmits a request for the remote control of the vehicle function to a vehicle. The cancellation device cancels the remote control of the vehicle function if the local control of the vehicle function is requested before the remote control of the vehicle function is executed according to the request for the remote control.

19 Claims, 4 Drawing Sheets

REMOTE CONTROL SYSTEM AND REMOTE CONTROL METHOD

INCORPORATION BY REFERENCE

The disclosure of Japanese Patent Application No. 2005-256925 filed on Sep. 5, 2005 including the specification, drawings and abstract is incorporated herein by reference in its entirety.

BACKGROUND OF THE INVENTION

1. Field of the Invention

The invention relates to a remote control system. More specifically, the invention relates to a remote control system and a remote control method in which the remote control of the function of a vehicle is executed when a request for the remote control of the function of the vehicle is transmitted to the vehicle from a control terminal operated by the user of the vehicle.

2. Description of the Related Art

Japanese Patent Application Publication No. JP-A-2003-41821 describes a remote control system in which the function of a vehicle, such as locking/unlocking of vehicle doors, is remotely controlled when the user of the vehicle, who possesses a control terminal, operates the control terminal in a predetermined manner. The remote control system includes the control terminal, an in-vehicle unit, and a communications center. The control terminal may be, for example, a mobile phone carried by the vehicle user. The in-vehicle unit is provided in the vehicle to remotely control the function of the vehicle. The communications center controls transmission of information between the control terminal and the in-vehicle unit. In this system, when the vehicle user operates the control terminal to request the remote control of the vehicle function, the request for the remote control is transmitted from the control terminal to the communications center. After the communications center receives the request for the remote control from the control terminal, the communications center transmits a remote-control command to the vehicle that requests the activation of the vehicle function. After the vehicle receives the remote-control command from the communications center, the remote control of the vehicle function is executed in the vehicle according to the remote-control command. Thus, in this system, when the vehicle user is far from the vehicle, the vehicle user can remotely control the vehicle function by operating the control terminal.

However, the following problem may arise if the remote control is executed whenever the request for the remote control is transmitted from the control terminal to the vehicle. In general, the local control of the vehicle function is also executed based on, for example, manual operation performed in a vehicle compartment or near the vehicle, as well as the remote control of the vehicle function executed based on the operation of the control terminal. Therefore, execution of the remote control in response to the request for the remote control transmitted from the control terminal may conflict with the local control of the vehicle function requested by a vehicle user present in or near the vehicle.

SUMMARY OF THE INVENTION

The invention provides a remote control system and a remote control method in which the remote control of a vehicle function is executed only when appropriate.

A first aspect of the invention relates to a remote control system in which the remote control of a vehicle function is executed. The remote control system includes a control terminal, and a cancellation device. The control terminal transmits a request for the remote control of the vehicle function to a vehicle. The cancellation device cancels the remote control of the vehicle function if the local control of the vehicle function is requested before the remote control of the vehicle function is executed according to the request for the remote control.

In the remote control system, if the local control of the vehicle function is requested before the remote control of the vehicle function is executed, the remote control is cancelled. This avoids the situation where the state of the vehicle is changed in a manner contrary to the intent of the vehicle user who requests the local control, as a result of the execution of the remote control.

A second aspect of the invention relates to a remote control method in which the remote control of a vehicle function is executed. According to the method, a request for the remote control of the vehicle function is transmitted to a vehicle, and the remote control of the vehicle function is cancelled if the local control of the vehicle function is requested before the remote control of the vehicle function is executed according to the request for the remote control.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Hereinafter, embodiments of the invention will be described with reference to the accompanying drawings.

Figure 1:
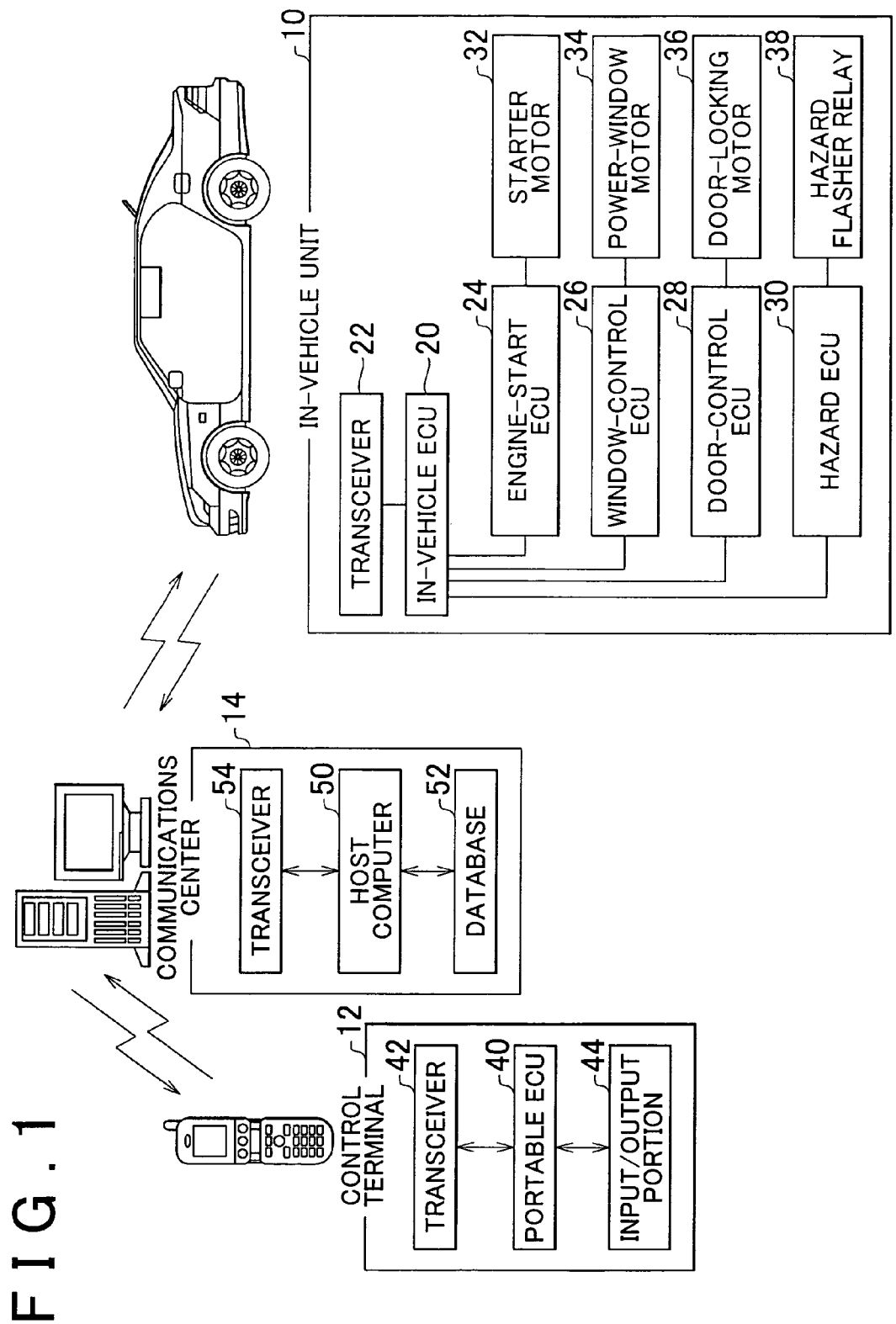
FIG. 1 is a diagram showing the configuration of a remote control system according to a first embodiment of the invention.

FIG. 1 shows the configuration of a remote control system according to a first embodiment of the invention. The remote control system according to the embodiment includes an in-vehicle unit 10, a control terminal 12, and a communications center 14. The in-vehicle unit 10 is provided in a vehicle. The control terminal 12 may be a portable phone, a personal computer, or a personal digital assistant (PDA) that is possessed or carried by the regular user of the vehicle, for example, the driver or owner of the vehicle. The communications center 14 controls the transmission of information between the in-vehicle unit 10 and the control terminal 12. In the remote control system according to the embodiment, when the regular user of the vehicle operates the control terminal 12 after the user exits the vehicle, a remote control is executed to remotely activate the functions of the vehicle.

The in-vehicle unit 10 includes an electronic control unit for the vehicle (hereinafter, referred to as "in-vehicle ECU") 20. The in-vehicle ECU 20 includes a computer that executes various controls. The in-vehicle ECU 20 operates according to software programs that are prestored in a storage device such as ROM. The in-vehicle ECU 20 also includes a storage device that stores, for example, information used to identify the vehicle in which the in-vehicle unit 10 is provided, and the phone number and URL of the communications center 14. The in-vehicle ECU 20 is connected to a transceiver 22 that performs wireless communication with the communications center 14 through a predetermined communication network. For example, the transceiver 22 may be a data communication module (DCM). The transceiver 22 transmits the information in the in-vehicle unit 10 to the communications center 14 via the communication network, and receives the information transmitted from the communications center 14 via the communication network. The in-vehicle ECU 20 transmits data to the transceiver 22, and receives data from the transceiver 22.

The in-vehicle ECU 20 is connected to units (slave ECUs) that activate the vehicle functions. That is, the in-vehicle ECU 20 is connected to an engine-start ECU 24, a window-control ECU 26, a door-control ECU 28, and a hazard ECU 30. When the transceiver 22 receives a remote-control command for activating the vehicle function from the communications center 14, the in-vehicle ECU 20 provides a drive instruction to the engine-start ECU 24, the window-control ECU 26, the door-control ECU 28, or the hazard ECU 30, as appropriate, to execute the remote control of the vehicle function, as described in detail later.

The engine-start ECU 24 is connected to a starter motor 32 that starts an engine to supply power to drive the vehicle. The window-control ECU 26 is connected to a power-window motor 34 that opens/closes windows provided in the doors of the vehicle. The door-control ECU 28 is connected to a door-locking motor 36 that locks/unlocks each door of the vehicle. The hazard ECU 30 is connected to a hazard flasher relay 38 that turns the hazard light of the vehicle on/off.

When the in-vehicle ECU 20 provides the drive instruction to the engine-start ECU 24, the window-control ECU 26, the door-control ECU 28, or the hazard ECU 30, or when a certain manual operation is performed in a vehicle compartment or near the vehicle, the engine-start ECU 24 drives the starter motor 32, the window-control ECU 26 drives the power-window motor 34, the door-control ECU 28 drives the door-locking motor 36, or the hazard ECU 30 drives the hazard flasher relay 38. As a result, the engine is started, the windows are opened/closed, the doors are locked/unlocked, or the hazard light is turned on/off.

Hereinafter, the term "remote control" signifies the control that indirectly activates each of the above-described vehicle functions according to the remote-control command supplied to the in-vehicle unit 10 from the control terminal 12 via the communications center 14. The term "local control" signifies the control that directly activates each of the vehicle functions according to the certain manual operation performed in the vehicle or near the vehicle.

When using the vehicle in which the in-vehicle unit 10 is provided, a vehicle key, which is carried by, for example, the driver of the vehicle, may be used to remotely control the vehicle functions, as well as the control terminal 12. The vehicle key may be used to remotely lock/unlock the doors of the vehicle, or turn an ignition switch on/off. The vehicle key may be a mechanical key, a wireless key, or a smart key. The wireless key or the smart key wirelessly transmits a command signal to the vehicle to control the vehicle function when a person operates the key or when the key receives, from the vehicle, a request signal that requests the key to transmit the command signal.

The control terminal 12 includes an electronic control unit (hereinafter, referred to as "portable ECU") 40. The portable ECU 40 includes a computer, and operates according to software programs prestored in a storage device such as ROM. The portable ECU 40 may also include a storage device that stores, for example, information used to identify the vehicle (or the in-vehicle unit 10) corresponding to the control terminal 12, information used to identify the control terminal 12 in which the portable ECU 40 is provided, and the phone number and URL of the communications center 14. The portable ECU 40 is connected to a transceiver 42 that performs wireless communication with the communications center 14 through a predetermined communication network. The transceiver 42 transmits the information in the control terminal 12 to the communications center 14 via the communication network, and receives the information transmitted from the communications center 14 via the communication network. The portable ECU 40 transmits data to the transceiver 42, and receives data from the transceiver 42.

The portable ECU 40 is connected to an input/output portion 44. The vehicle user manually operates the input/output portion 44 to input data in the input/output portion 44. The input/output portion 44 outputs an indication and a sound toward the vehicle user. The control terminal 12 may include a web browser. By operating the input/output portion 44, the vehicle user can access, for example, files and data stored in external web servers via the communication network. Thus, the vehicle user can obtain various pieces of information provided by the communications center 14, more specifically, a web screen that is used to request the remote control of at least one of the vehicle functions (hereinafter, the web screen will be referred to as "remote-control web screen"). The remote-control web screen will be described in detail later.

The communications center 14 includes a host computer 50 that performs calculations at high speed. The host computer 50 operates according to software programs prestored in a storage device such as ROM. The host computer 50 is connected to a database 52. The database 52 stores information about users of the communications center 14, that is, regular users of vehicles. For example, the database 52 stores, for example, information used to identify each user, the mail address and the telephone number of the control terminal 12 of each user, the information used to identify each vehicle, and the telephone number of each vehicle.

The host computer 50 of the communications center 14 is connected to a transceiver 54 that performs wireless communication with the in-vehicle unit 10 and the control terminal 12 via a predetermined communication network. The transceiver 54 transmits the information in the communications center 14 to the in-vehicle unit 10 and the control terminal 12 via the communication network, and receives the information transmitted from the in-vehicle unit 10 and the control terminal 12 to the communications center 14 via the communication network. The host computer 50 of the communications center 14 transmits data to the transceiver 54, and receives data from the transceiver 54.

Figure 2:
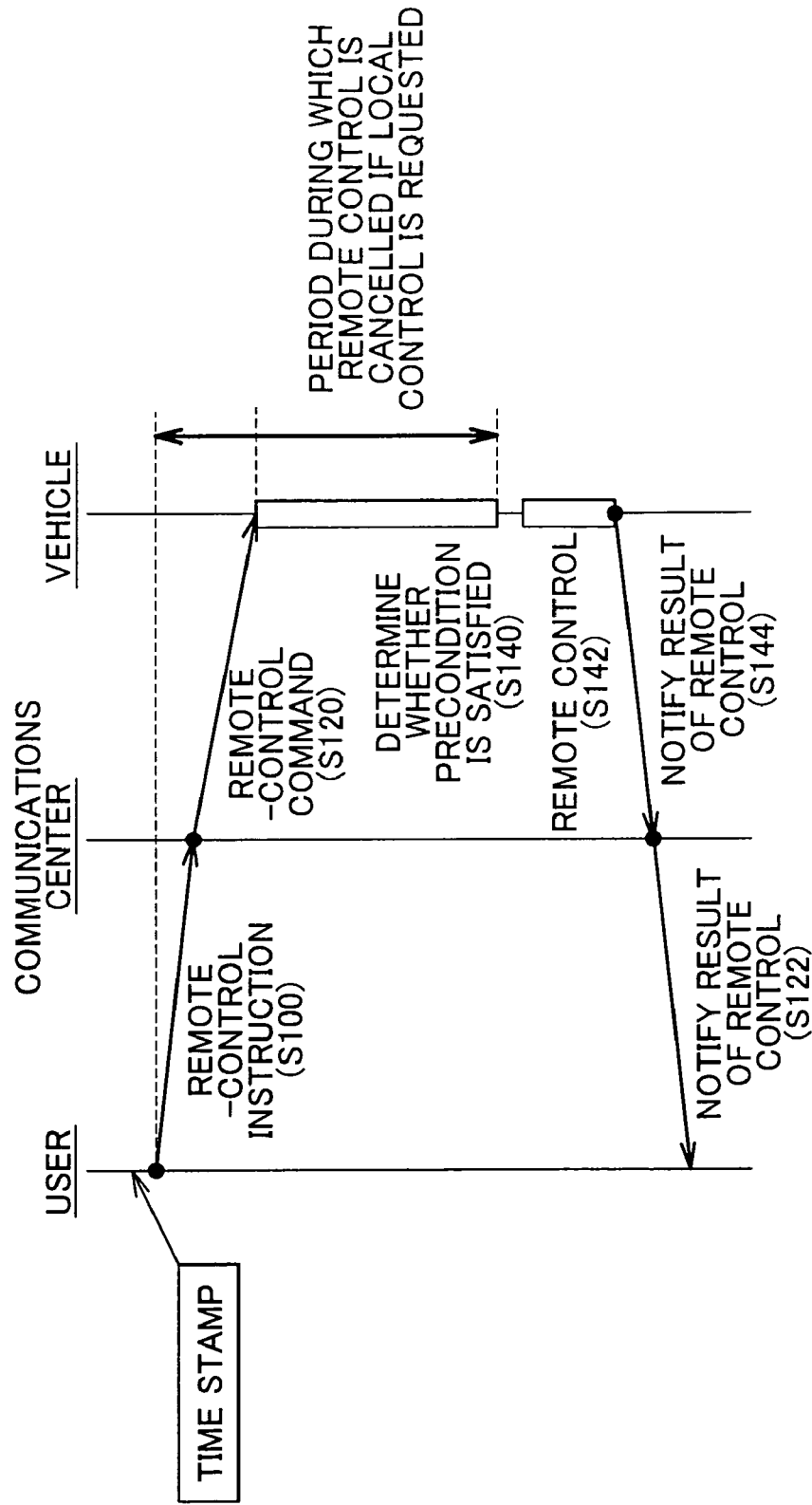
FIG. 2 is a sequence diagram showing a control routine executed in the remote control system according to the first embodiment.

Hereinafter, the operation of the remote control system according to the embodiment will be described. FIG. 2 is a sequence diagram showing an example of a control routine executed in the remote control system according to the embodiment.

After the vehicle user exits the vehicle, the vehicle user may want to start the engine, to close/open the windows of the vehicle to a desired position, to lock/unlock the doors of the vehicle, or to turn the hazard light on/off, for example, if the vehicle user forgets to control the vehicle function before exiting the vehicle, or if the vehicle function needs to be controlled to protect the vehicle from theft or to suppress an increase in the temperature in the vehicle compartment. In this case, the vehicle user operates the input/output portion 44 of the control terminal 12 to start the web browser.

The communications center 14 stores the format required to remotely control the vehicle functions according to the operation of the control terminal 12. When the vehicle user operates the control terminal 12 in a certain manner after the web browser is started, the control terminal 12 is wirelessly connected to the communications center 14 via the communication network. Then, the control terminal 12 transmits a request for provision of the remote-control web screen to the communications center 14. When the communications center 14 receives the request from the control terminal 12, the communications center 14 provides the remote-control web screen to the control terminal 12 in response to the request. Thus, the control terminal 12 obtains the remote-control web screen from the communications center 14 according to the above-described processes.

The remote-control web screen displays the functions of the vehicle that can be remotely controlled by the control terminal 12. The control terminal 12 determines the vehicle function that the vehicle user wants to remotely control, based on the presence or absence of a check mark in each of check boxes for the remote controls of the vehicle functions that can be executed. If the vehicle user places a check mark in at least one of the check boxes, and then operates the control terminal 12 to transmit an instruction to remotely control the vehicle function corresponding to the check mark (hereinafter, this instruction will be referred to as "remote-control instruction"), the control terminal 12 transmits the remote-control instruction from the transceiver 42 to the communications center 14. Thus, the communications center 14 is notified that the vehicle user has requested the remote control of the vehicle function corresponding to the check mark (step S100).

When the transceiver 54 receives the remote-control instruction from the control terminal 12 after the communications center 14 provides the remote-control web screen to the control terminal 12, the communications center 14 determines the vehicle function that needs to be remotely controlled. Then, the communications center 14 is connected to the in-vehicle unit 10 in the vehicle corresponding to the control terminal 12 via the wireless communication, and the communications center 14 transmits the remote-control command to the in-vehicle unit 10 (step S120). The remote-control command indicates that the vehicle user has requested the remote control of the specified vehicle function by operating the control terminal 12.

After the in-vehicle unit 10 receives the remote-control command from the communications center 14, the in-vehicle unit 10 determines the vehicle function that needs to be remotely controlled. Before the in-vehicle unit 10 executes the remote control of the vehicle function based on the remote-control command, the in-vehicle unit 10 determines whether a precondition for executing the remote control is satisfied (step S140). The precondition may be satisfied when at least one of i) a precondition that the interval between the time at which the vehicle receives the remote-control command and the time at which the vehicle user requests the remote control (e.g., the time at which the vehicle user operates the control terminal 12, or the time at which the communications center 14 receives the remote-control instruction) is less than a predetermined value; ii) a precondition that conflicting remote controls (e.g., a remote control for opening the windows and a remote control for closing the windows) are not requested substantially simultaneously; iii) a precondition that the ignition switch and the accessory switch of the vehicle are off; iv) a precondition that the vehicle is unoccupied and there is no vehicle key in the vehicle; and v) a precondition that the actual state of the vehicle will be changed if the requested remote control is executed, is satisfied.

If the in-vehicle unit 10 determines that the precondition is satisfied, the in-vehicle ECU 20 transmits an instruction to execute the remote control of the specified vehicle function according to the remote-control command, to the appropriate ECU in control of the specified vehicle function. Then, the ECU 24, 26, 28, or 30 controls the specified vehicle function by driving the corresponding actuator 32, 34, 36 or 38 (step S142).

If the in-vehicle unit 10 determines that the precondition is satisfied, the in-vehicle unit 10 may perform an operation for calling attention to the remote control for a predetermined time (for example, two seconds), before the remote control is executed based on the remote-control command. In this case, the in-vehicle unit 10 performs this operation only when at least one portion of the vehicle body is mechanically moved by the remote control (for example, only when the windows are opened/closed by the remote control in this embodiment). That is, it is not necessary to perform this operation when the engine is started, the doors are locked/unlocked, or the hazard light is turned on/off by the remote control in this embodiment. For example, a predetermined sound or warning may be output toward the occupant in the vehicle using a buzzer or a speaker. Alternatively, a predetermined sound or warning may be output toward a person near the vehicle, using a horn, a buzzer, or an external speaker.

After the in-vehicle unit 10 executes the remote control of the vehicle function based on the remote-control command transmitted from the communications center 14, the in-vehicle unit 10 determines the result of the remote control. More specifically, the in-vehicle unit 10 determines whether the remote control has been normally completed. Then, the in-vehicle unit 10 notifies the communications center 14 of the result of the remote control (step S144). Then, after the communications center 14 receives the result of the remote control from the in-vehicle unit 10, the communications center 14 notifies the control terminal 12 of the result of the remote control, for example, by e-mail (step S122).

When the control terminal 12 receives the result of the remote control from the communications center 14, the control terminal 12 indicates the result of the remote control on the display of the input/output portion 44, or outputs a sound using a speaker so that the vehicle user can confirm the result of the remote control. In this case, after the vehicle user, who possesses the control terminal 12, operates the control terminal 12 to request the remote control of the vehicle function, the vehicle user can confirm the result of the remote control by seeing or hearing the output from the control terminal 12.

Thus, in the remote control system in this embodiment, when the vehicle user operates the control terminal 12 and the control terminal 12 transmits the request for the remote control of the specified vehicle function to the vehicle via the communications center 14, the vehicle function is remotely controlled. Therefore, when the vehicle user is not in the vehicle, or when the vehicle user is far from the vehicle, the vehicle user can activate the vehicle function by operating the control terminal 12. Thus, in the remote control system according to the embodiment, for example, if the vehicle user forgets to manually operate any of the vehicle functions before or while the vehicle user gets out of the vehicle, the vehicle user can remotely control the vehicle function, by operating the control terminal 12.

In the remote control system according to the embodiment, after the in-vehicle unit 10 is requested to execute the remote control of the specified vehicle function, the in-vehicle unit 10 notifies the vehicle user of the result of the remote control via the communications center 14 and the control terminal 12. Therefore, after the vehicle user requests the remote control of the vehicle function, the vehicle user can determine whether the remote control has been normally completed in the vehicle, by seeing the indication on the display of the control terminal 12, or hearing the sound output from the control terminal 12.

In the remote control system according to the embodiment, the vehicle functions can be activated by remote control, and by local control. If the requested remote control is always executed, however, the state of the vehicle may be changed due to the remote control in a manner contrary to the intention of a vehicle user who requests the local control in the vehicle or near the vehicle. In view of this, in the remote control system in the embodiment, the remote control is executed without interfering with the local control. Hereinafter, a case where the remote control is appropriately executed without interfering with the local control according to the embodiment will be described with reference to FIG. 2.

In this embodiment, if the vehicle user places a check mark in at least one of the check boxes, and then operates the control terminal 12 to transmit the remote-control instruction, the control terminal 12 transmits the remote-control instruction to the communications center 14. The remote-control instruction indicates that the vehicle user has requested the remote control of the vehicle function corresponding to the check mark. Before the control terminal 12 transmits the remote-control instruction to the communications center 14, the control terminal 12 stores the time at which the vehicle user operates the control terminal 12 to transmit the remote-control instruction (hereinafter, this time point will be referred to as "remote-control request time"). Then the control terminal 12 attaches the information on the remote-control request time to the remote-control instruction, and transmits, to the communications center 14, the remote-control instruction that contains the information on the remote-control request time.

After the communications center 14 receives, from the control terminal 12, the remote-control instruction that contains the information on the remote-control request time, the communications center 14 transmits, to the in-vehicle unit 10, the remote-control command that contains the information on the remote-control request time. After the in-vehicle unit 10 receives, from the communications center 14, the remote-control command that contains the information on the remote-control request time, the in-vehicle unit 10 starts the process of determining whether the precondition for executing the remote control based on the remote-control command is satisfied. At the same time, the in-vehicle unit 10 reads the information on the remote-control request time. Then, the in-vehicle unit 10 determines whether the operation for requesting the local control of at least one of the vehicle functions is performed after the remote-control request time, and before the time at which the process of determining whether the precondition is satisfied is completed (hereinafter the time will be referred to as "determination completion time"). That is, the in-vehicle unit 10 determines whether the time at which the user performs the operation for requesting the local control (hereinafter, the time will be referred to as "local-control request time") is later than the remote-control request time, and the local-control request time is earlier than the determination completion time.

If the vehicle user does not perform the operation for requesting the local control after the remote-control request time and before the determination completion time, and the precondition for executing the requested remote control is satisfied, the in-vehicle unit 10 provides the drive instruction to the appropriate slave ECU. If the operation for requesting the local control is performed after the remote-control request time and before the determination completion time, that is, if the local-control request time is later than the remote-control request time, and the local-control request time is earlier than the determination completion time, the remote control of the vehicle function based on the request for the remote control is cancelled, irrespective of whether the precondition is satisfied.

In the remote control system according to the embodiment, the local control may be requested before the remote control of the specified vehicle function is executed by operating the control terminal 12. In other words, the local control may be requested after the remote-control request time, and before the determination completion time. In this case, the requested remote control of the specified vehicle function is cancelled, and the local control is preferentially executed.

With this configuration, when a vehicle user in the vehicle compartment or near the vehicle requests the local control of at least one of the vehicle functions, the remote control is not executed even if another vehicle user, who possesses the control terminal 12, requests the remote control of the specified vehicle function. This avoids the situation where the state of the vehicle is changed in a manner contrary to the intent of the vehicle user who requests the local control, as a result of execution of the remote control. This also avoids the situation where the vehicle user, who requests the local control in the vehicle compartment, cannot get out of the vehicle, for example, when the windows are closed or the doors are locked due to the remote control. Thus, in the remote control system according to the embodiment, the specified vehicle function is remotely controlled based on the operation of the control terminal 12 only when appropriate.

In the first embodiment, the remote control system includes the in-vehicle unit 10 provided in the vehicle; the control terminal 12 carried by the vehicle user; and the communications center 14 that controls the transmission of information. However, the invention is not limited to the configuration. The invention may be applied to a system that includes only the in-vehicle unit 10 and the control terminal 12, and does not include the communications center 14. In this case, the term "remote control" signifies the control that activates each of the vehicle functions according to the remote-control command transmitted to the in-vehicle unit 10 directly from the control terminal 12. The term "local control" signifies the control that directly activates each of the vehicle functions according to a certain manual operation performed in the vehicle.

In the first embodiment, the remote-control request time is set to the time at which the vehicle user operates the operation terminal 12 to transmit the remote-control instruction to the in-vehicle unit 10. The remote control is cancelled when the local control is requested after the remote-control request time, and before the determination completion time.

Figure 3:
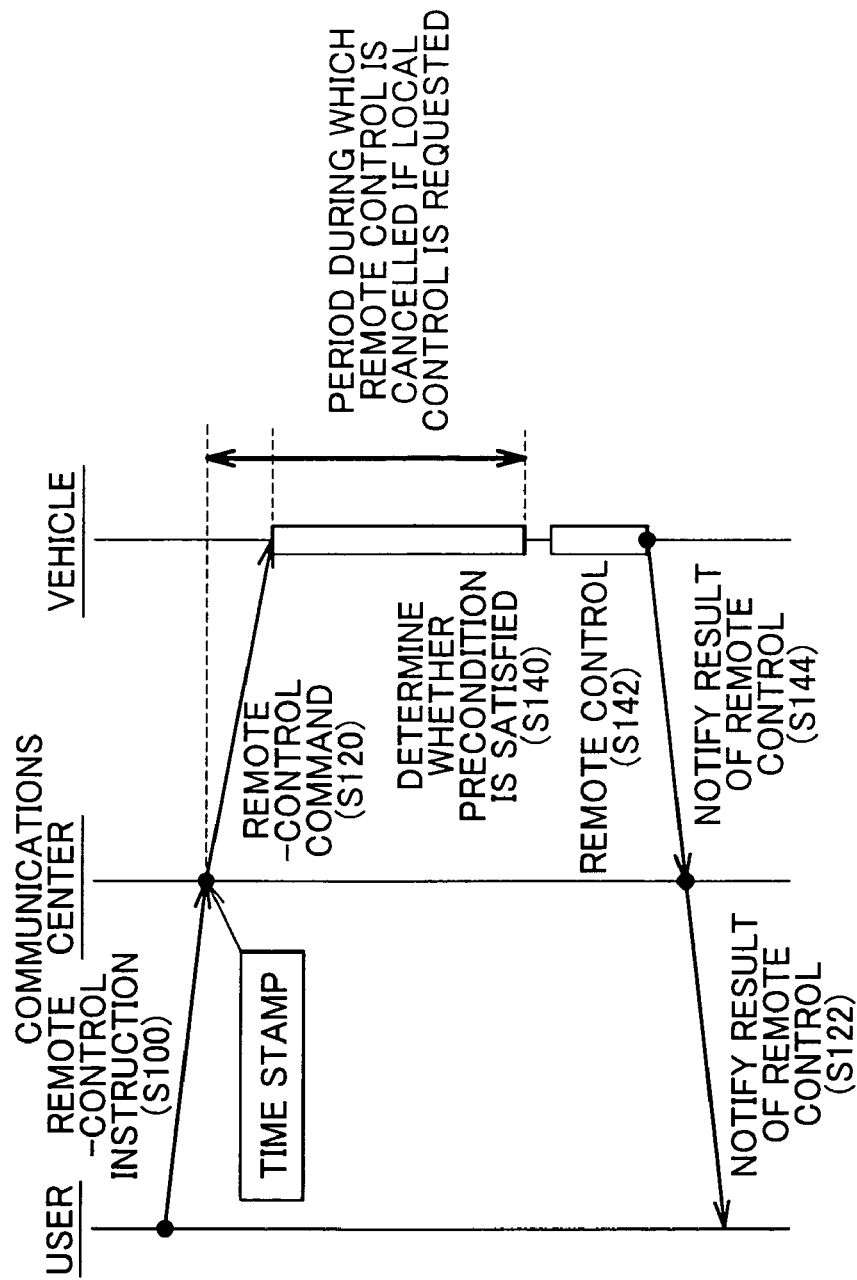
FIG. 3 is a sequence diagram showing a control routine executed in a remote control system according to a second embodiment of the invention.
Figure 4:
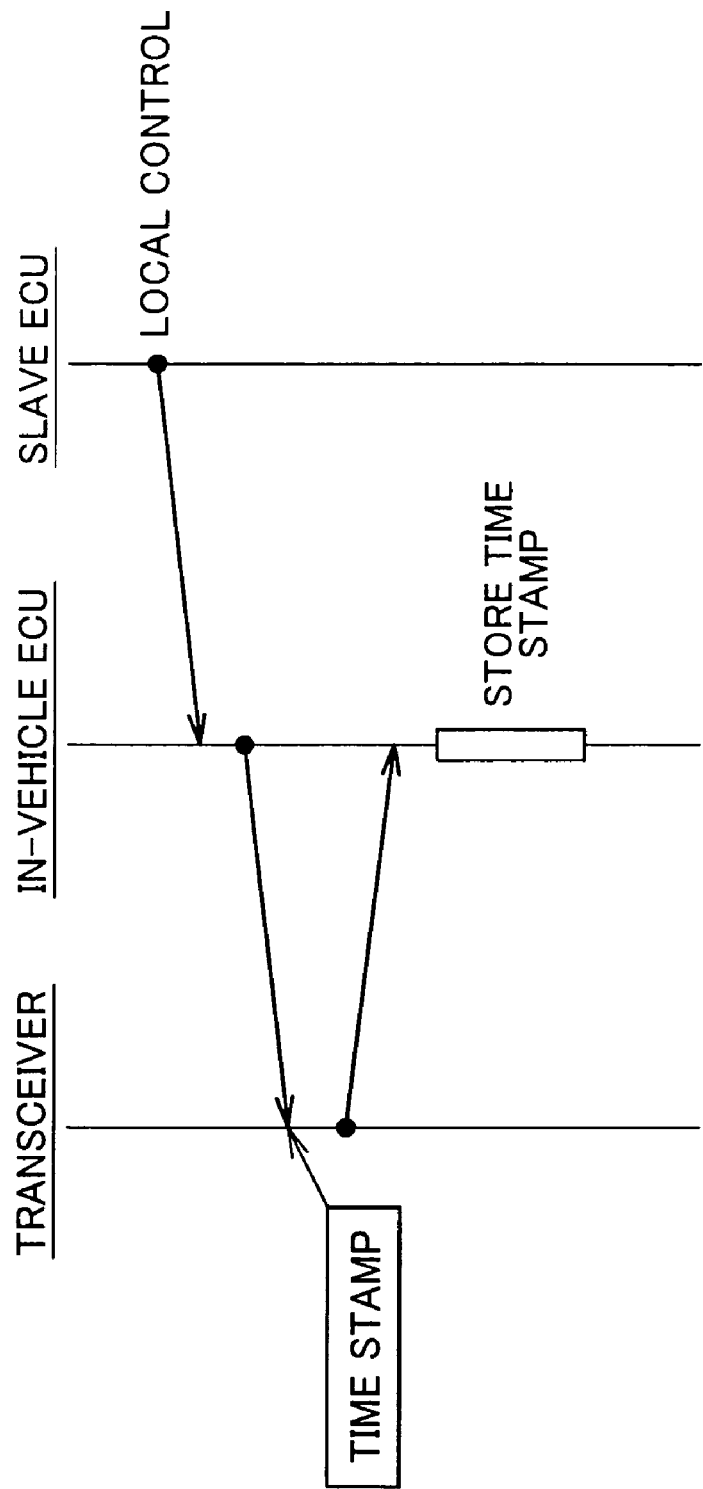
FIG. 4 is a diagram explaining a method of determining a time at which an operation for requesting a local control is performed.

In contrast, in the second embodiment of the invention, the remote-control request time is set to the time at which the communications center 14 receives the remote-control instruction from the control terminal 12. The remote control is cancelled if the local control is requested after the remote-control request time, and before the determination completion time. FIG. 3 is a sequence diagram showing an example of a control routine executed in a remote control system according to the second embodiment. In FIG. 3, the same steps as those in the routine shown in FIG. 2 are denoted by the same reference numerals, and description thereof will be omitted.

In this embodiment, if the vehicle user places a check mark in at least one of the check boxes, and then operates the control terminal 12 to transmit the remote-control instruction, the control terminal 12 transmits the remote-control instruction to the communications center 14. The remote-control instruction indicates that the vehicle user has requested the remote control of the vehicle function corresponding to the check mark. When the communications center 14 receives the remote-control instruction from the control terminal 12, the communications center 14 transmits, to the in-vehicle unit 10, the remote-control command based on the remote-control instruction. Before the communications center 14 transmits the remote-control command, the communications center 14 stores the time at which the communications center 14 receives the remote-control instruction from the control terminal 12 (hereinafter, this time will be referred to as "remote-control request time" in this embodiment"). Then, the communications center 14 attaches the information on the remote-control request time to the remote-control command, and transmits, to the in-vehicle unit 10, the remote-control command that contains the information on the remote-control request time.

After the in-vehicle unit 10 receives, from the communications center 14, the remote-control command that contains the information on the remote-control request time, the in-vehicle unit 10 starts the process of determining whether the precondition for executing the remote control of the specified vehicle function based on the remote-control command is satisfied. At the same time, the in-vehicle unit 10 reads the information on the remote-control request time. Then, the in-vehicle unit 10 determines whether the operation for requesting the local control of at least one of the vehicle functions is performed after the remote-control request time and before the determination completion time. That is, the in-vehicle unit 10 determines whether the local-control request time is later than the remote-control request time, and earlier than the determination completion time.

If the vehicle user does not perform the operation for requesting the local control after the remote-control request time and before the determination completion time, and the precondition for executing the requested remote control is satisfied, the in-vehicle unit 10 provides the drive instruction to the appropriate slave ECU to execute the requested remote control. If the operation for requesting the local control is performed after the remote-control request time and before the determination completion time, that is, if the local-control request time is later than the remote-control request time, and the local-control request time is earlier than the determination completion time, the remote control of the vehicle function based on the request for the remote control is cancelled, irrespective of whether the precondition is satisfied.

In the remote control system according to the embodiment, the local control may be requested before the remote control of the specified vehicle function is executed according to the request for the remote control transmitted by operating the control terminal 12. In other words, the local control may be requested after the remote-control request time and before the determination completion time. In this case, the requested remote control of the specified vehicle function is cancelled, and the local control is preferentially executed.

With this configuration, when a vehicle user in the vehicle compartment or near the vehicle requests the local control of at least one of the vehicle functions, the remote control is not executed even if another vehicle user, who possesses the control terminal 12, requests the remote control of the specified vehicle function. This avoids the situation where the state of the vehicle is changed due to the remote control in a manner contrary to the intention of the vehicle user who requests the local control. This also avoids the situation where the vehicle user, who requests the local control in the vehicle compartment, cannot get out of the vehicle, for example, when the windows are closed or the doors are locked due to the remote control. Thus, in the remote control system according to the embodiment, the remote control of the specified vehicle function is executed only when appropriate.

The local control may be requested before the remote control of the specified vehicle function is executed. In other words, a local control that is requested after the remote-control request time and before the determination completion time will override the execution of the remote control of the specified vehicle function. In this case, the in-vehicle unit 10 cancels the requested remote control of the specified vehicle function in the first and second embodiments. Thus, the "cancellation device" according to the invention is realized.

In the first and second embodiments, it is determined whether the operation for requesting the local control is performed after the remote-control request time and before the determination completion time. If an affirmative determination is made, the remote control is cancelled. However, the invention is not limited to this configuration. It may be determined whether the operation for requesting the local control is performed after the remote-control request time and before the time at which the remote control is actually started in the vehicle. In this case as well, if an affirmative determination is made, the remote control is cancelled. With this configuration, it is possible to obtain the same effects as those obtained in the first and second embodiments.

In the first and second embodiments, the time at which the operation for requesting the local control is performed needs to be determined. Based on the determined time, it is determined whether the operation for requesting the local control is performed after the remote-control request time and before the determination completion time or the time at which the remote control is actually started in the vehicle. A clock may be provided in each slave ECU 26 that first detects the operation for requesting the local control, such as the engine-start ECU 24 and the window-control ECU 26. However, if a clock is provided in each slave ECU 26, a large number of clocks are necessary. Accordingly, only one clock is provided in the transceiver 22 of the in-vehicle unit 10. With this configuration, when the slave ECU 26 detects the operation for requesting the local control, the slave ECU transmits, to the in-vehicle ECU 20, the request for the local control, and the in-vehicle ECU 20 transmits, to the transceiver 22, the request for the local control. The clock determines the time at which the transceiver 22 receives the request for the local control from the in-vehicle ECU 20. The transceiver 22 transmits the information on the determined time to the in-vehicle ECU 20. The in-vehicle ECU 20 stores the determined time. The determined time is regarded as the time at which the operation for requesting the local control is performed. With this configuration, it is sufficient to provide only one clock in the in-vehicle unit 10 to determine the time at which the operation for requesting the local control is performed.

In the first and second embodiments, the engine may be started, the windows may be opened/closed, the vehicle doors may be locked/unlocked, or the hazard light may be turned on/off by the remote control. However, for example, the vehicle doors, a trunk, and a sliding roof may also be opened/ closed, a warning may be raised/stopped using a horn or a buzzer, and a security system may be armed/disarmed by the remote control.

Further, in the first and second embodiments, the control terminal 12 is possessed and carried by the vehicle user. However, for example, a public telephone or a fixed telephone at home may be used as the control terminal 12. In this case, when a predetermined button is operated while the control terminal 12 is connected with the communications center 14 via a communication network, the request for the remote control of the specified vehicle function is transmitted from the control terminal 12 to the communications center 14.

What is claimed is:

1. A remote control system in which a remote control of a vehicle function is executed, comprising:
    a control terminal that transmits a request for the remote control of the vehicle function to a vehicle; and
    a cancellation device in the vehicle that cancels the remote control of the vehicle function, wherein the cancellation device cancels the remote control of the vehicle function if the cancellation device determines that a local control of the vehicle function is requested before the remote control of the vehicle function is executed according to the request for the remote control.

2. The remote control system according to claim 1, wherein the cancellation device cancels the remote control of the vehicle function if a local-control request time at which the local control of the vehicle function is requested is later than a remote-control request time at which the remote control of the vehicle function is requested.

3. The remote control system according to claim 1, wherein the cancellation device cancels the remote control of the vehicle function if a local-control request time at which the local control of the vehicle function is requested is earlier than a time at which the remote control of the vehicle function is started in the vehicle.

4. The remote control system according to claim 3, wherein the cancellation device cancels the remote control of the vehicle function if the local-control request time is both earlier than the time at which the remote control of the vehicle function is started in the vehicle, and earlier than a time at which a process of determining whether a precondition for executing the remote control is satisfied is completed.

5. The remote control system according to claim 2, wherein the remote-control request time is a time at which a vehicle user operates the control terminal to transmit the request for the remote control to the vehicle.

6. The remote control system according to claim 2, further comprising:
    a communications center that transmits, to the vehicle, the request for the remote control transmitted from the control terminal,
    wherein the remote-control request time is a time at which the communications center receives, from the control terminal, the request for the remote control.

7. The remote control system according to claim 2, wherein the local-control request time is a time at which the vehicle receives a request for the local control of the vehicle function.

8. The remote control system according to claim 4, wherein the precondition is satisfied in at least one of i) a case where an interval between a time at which the vehicle receives the request for the remote control and a remote-control request time at which the remote control is requested is less than a predetermined value; ii) a case where conflicting remote controls are not requested substantially simultaneously; iii) a case where an ignition switch and an accessory switch of the vehicle are off; iv) a case where the vehicle is unoccupied and there is no vehicle key in the vehicle; and v) a case where an actual state of the vehicle will be changed if the requested remote control is executed.

9. The remote control system according to claim 1, wherein the cancellation device cancels the remote control of the vehicle function if the local control of the vehicle function is requested after the vehicle receives the request for the remote control from the control terminal, and before the remote control of the vehicle is executed.

10. A remote control method in which a remote control of a vehicle function is executed, comprising the steps of:
    transmitting a request for the remote control of the vehicle function to a vehicle;
    determining from within the vehicle if a local control of the vehicle function is requested before the remote control of the vehicle function is executed according to the request for the remote control of the vehicle; and
    canceling from within the vehicle the remote control of the vehicle function if the local control of the vehicle function is requested before the remote control of the vehicle function is executed according to the request for the remote control of the vehicle function.

11. The remote control method according to claim 10, wherein the remote control of the vehicle function is canceled if a local-control request time at which the local control of the vehicle function is requested is later than a remote-control request time at which the remote control of the vehicle function is requested.

12. The remote control method according to claim 10, wherein the remote control of the vehicle function is canceled if a local-control request time at which the local control of the vehicle function is requested is earlier than a time at which the remote control of the vehicle function is started.

13. The remote control system according to claim 12, wherein the cancellation device cancels the remote control of the vehicle function if the local-control request time is both earlier than the time at which the remote control of the vehicle function is started in the vehicle, and earlier than a time at which a process of determining whether a precondition for executing the remote control is satisfied is completed.

14. The remote control method according to claim 11, wherein the remote-control request time is a time at which a vehicle user operates a control terminal to transmit the request for the remote control of the vehicle.

15. The remote control method according to claim 11, wherein a communications center transmits, to the vehicle, the request for the remote control transmitted from a control terminal; and the remote-control request time is a time at which the communications center receives, from the control terminal, the request for the remote control.

16. The remote control method according to claim 11, wherein the local-control request time is a time at which the vehicle receives a request for the local control of the vehicle function.

17. The remote control method according to claim 13, where the precondition is satisfied in at least one of i) a case where an interval between a time at which the vehicle receives the request for the remote control and a remote-control request time at which the remote control is requested is less than a predetermined value; ii) a case where conflicting remote controls are not requested substantially simultaneously; iii) a case where an ignition switch and an accessory switch of the vehicle are off; iv) a case where there is no person and no vehicle key in the vehicle;
    and v) a case where an actual state of the vehicle will be changed if the requested remote control is executed.

18. The remote control method according to claim 10, wherein the remote control of the vehicle function is cancelled if the local control of the vehicle function is requested after a vehicle receives the request for the remote control from a control terminal, and before the remote control of the vehicle function is executed.

19. A remote control system in which a remote control of a vehicle function is executed, comprising:
  a control terminal that transmits a request for the remote control of the vehicle function to a vehicle; and
  cancellation means in the vehicle for canceling the remote control of the vehicle function if the cancellation means determines that a local control of the vehicle function is requested before the remote control of the vehicle function is executed according to the request for the remote control.

\* \* \* \* \*